Patented May 21, 1929.

UNITED STATES PATENT OFFICE.

ROBERT B. MacMULLIN, OF LA SALLE, AND ANTHONY GEORGE, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF CALCIUM HYPOCHLORITE.

No Drawing. Application filed August 4, 1926. Serial No. 127,174.

This invention relates to improvements in the production of calcium hypochlorite. Calcium hypochlorite, that is $Ca(OCl)_2$, in pure form is relatively stable. but calcium chloride if present in substantial amount makes it relatively unstable. This is apparently due to the hygroscopic properties of calcium chloride. This invention provides an improved method of making calcium hypochlorite products of high purity, particularly with reference to contamination with calcium chloride, and which has several further important advantages.

According to the present invention, caustic soda and lime are chlorinated in the presence of water, the amount of caustic soda being in excess of that chemically equivalent to the lime, to produce calcium hypochlorite. Following chlorination, it is advantageous to treat the slurry to convert sodium hypochlorite present to calcium hypochlorite, for example by treatment with calcium chloride, to avoid any decomposition which might ensue on drying a composite product containing sodium hypochlorite in addition to calcium hypochlorite. By employing an amount of caustic soda in excess of that chemically equivalent to the lime, somewhat thicker slurries may be produced, making it possible to increase the effective capacity of any particular drying or evaporating equipment used for the removal of water from the product. In place of caustic soda, other caustic alkalis may be used in carrying out the invention.

The invention will be illustrated by the following example: 120 pounds of caustic soda and 78 pounds of high grade lime (95% $Ca(OH)_2$) are mixed with 562 pounds of water until all of the caustic has dissolved. The mixture is then chlorinated until only about 2% of free alkali remains. About 174 pounds of chlorine are required. The chlorination may, for example, be carried out in the neighborhood of 20° C. If the slurry is too thick to permit of ready chlorination to completion with the particular type of agitation employed, more water may be added. After chlorination is complete, 36 pounds of finely divided calcium chloride ($CaCl_2.2H_2O$) are added to the mixture with stirring. As the calcium chloride reacts with the sodium hypochlorite present, salt and calcium hypochlorite is precipitated. The resulting slurry may be evaporated to dryness to produce a calcium hypochlorite product containing, for example, about 47% of calcium hypochlorite, the balance being principally sodium chloride.

The slurry may also be treated to separate precipitated calcium hypochlorite from dissolved products of the reaction, to obtain a product containing a higher proportion of calcium hypochlorite. The calcium hypochlorite may, for example, be filtered from the slurry and dried either with or without pressing, and the proportion of sodium chloride in the product may be somewhat reduced by the addition of water to dissolve more or less of the salt prior to filtration. Unlike calcium chloride, the presence of sodium chloride in the product apparently does not adversely affect the stability of the calcium hypochlorite.

We claim:

1. A process of making calcium hypochlorite which comprises chlorinating a caustic alkali and lime in the presence of water, the amount of caustic alkali being in excess of that chemically equivalent to the lime, treating the chlorinated mixture with a calcium compound reacting with alkali hypochlorite to form calcium hypochlorite, and separating calcium hypochlorite from the resulting mixture.

2. A process of making calcium hypochlorite which comprises chlorinating caustic soda and lime in the presence of water, the amount of caustic soda being in excess of that chemically equivalent to the lime, treating the chlorinated mixture with calcium chloride, and separating calcium hypochlorite from the resulting mixture.

In testimony whereof we affix our signatures.

ROBERT B. MacMULLIN.
ANTHONY GEORGE.